(12) United States Patent
Lesage

(10) Patent No.: US 10,799,844 B2
(45) Date of Patent: Oct. 13, 2020

(54) GAS INJECTION ELEMENT FOR A FLUID CATALYTIC CRACKING UNIT AND GAS DISTRIBUTION SYSTEM EQUIPPED WITH THIS INJECTION ELEMENT

(71) Applicant: Total Raffinage Chimie, Courbevoie (FR)

(72) Inventor: Romain Lesage, Antwerp (BE)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 16/489,030

(22) PCT Filed: Feb. 22, 2018

(86) PCT No.: PCT/EP2018/054441
§ 371 (c)(1),
(2) Date: Aug. 27, 2019

(87) PCT Pub. No.: WO2018/154019
PCT Pub. Date: Aug. 30, 2018

(65) Prior Publication Data
US 2020/0061567 A1    Feb. 27, 2020

(30) Foreign Application Priority Data
Feb. 27, 2017  (FR) ...................... 17 51530

(51) Int. Cl.
*B01J 8/18*     (2006.01)
*B01J 4/00*     (2006.01)

(52) U.S. Cl.
CPC ............. *B01J 8/1827* (2013.01); *B01J 4/002* (2013.01); *B01J 8/1872* (2013.01);
(Continued)

(58) Field of Classification Search
CPC ........ B01J 8/1827; B01J 4/002; B01J 8/1872; B01J 2219/0218; B01J 2219/0263;
(Continued)

(56) References Cited

U.S. PATENT DOCUMENTS 1,261,687 A * 4/1918 Brandon ................. F16L 37/18
                                                     285/312
5,188,399 A * 2/1993 Durina .................. F16L 37/252
                                                     285/148.26
(Continued)

FOREIGN PATENT DOCUMENTS

WO    2016016088 A1    2/2016
WO    2016016094 A1    2/2016

OTHER PUBLICATIONS

International Search Report issued in Application No. PCT/EP2018/054441, dated May 9, 2018, 5 pages.

*Primary Examiner* — Huy Tram Nguyen
(74) *Attorney, Agent, or Firm* — Albert Shung

(57) ABSTRACT

A gas injection element (10) for a system for distributing a gas inside a chamber of a fluid catalytic cracking unit. This injection member comprises a passage (14) extending entirely therethrough, and—an inner ceramic member (20) having an inner surface (22) that entirely delimits the through-passage (14); and—a hollow metal sleeve (30), inside which at least a portion of the inner member (20) is received, the sleeve (30) and the inner member (20) respectively having an inner surface (32) and an outer surface (24) with matching shapes allowing the inner member (20) to move relative to the sleeve (30) in a direction parallel to an axis (X) of the passage (14), the outer (32) and inner surfaces (24) being provided with fastening elements (26, 36) that engage to reversibly fasten the sleeve and the inner member.

9 Claims, 1 Drawing Sheet

(52) U.S. Cl.
CPC .......... *B01J 2208/00858* (2013.01); *B01J 2208/00902* (2013.01); *B01J 2219/0218* (2013.01); *B01J 2219/0263* (2013.01); *B01J 2219/0286* (2013.01)

(58) Field of Classification Search
CPC ...... B01J 2208/00902; B01J 2219/0286; B01J 2208/00858
USPC ....................................................... 422/139
See application file for complete search history.

(56) References Cited

U.S. PATENT DOCUMENTS

| | | | |
|---|---|---|---|
| 6,503,461 B1 | 1/2003 | Burgard et al. | |
| 7,832,775 B2* | 11/2010 | Regener | F02B 33/44 |
| | | | 285/377 |
| 2002/0046556 A1* | 4/2002 | Reid | B01D 35/30 |
| | | | 55/484 |
| 2003/0184091 A1* | 10/2003 | Ricard | F16L 37/113 |
| | | | 285/358 |
| 2012/0138698 A1 | 6/2012 | Wilson et al. | |
| 2017/0165626 A1* | 6/2017 | Bories | B01J 8/1827 |

* cited by examiner

A-A

GAS INJECTION ELEMENT FOR A FLUID CATALYTIC CRACKING UNIT AND GAS DISTRIBUTION SYSTEM EQUIPPED WITH THIS INJECTION ELEMENT

CROSS-REFERENCE TO RELATED APPLICATIONS

This application claims the benefit of PCT/EP2018/054441 filed Feb. 22, 2018, which claims priority from FR 1751530 filed Feb. 27, 2017, which are incorporated herein by reference in their entireties for all purposes.

The invention relates to the injection of gas, notably the injection of air or of steam, into a fluid catalytic cracking (or FCC) unit. The invention also relates to a gas injection element and to a gas distribution system equipped with one or more gas injection elements.

In an FCC unit, the air injection systems (air grid, air ring, pipe grid of the regenerator) or steam injection systems (notably in the case of stripping operations) are generally equipped with injection nozzles that make it possible to control the distribution of the flow of gas and the ejection speed. These elements are subjected to erosion by the catalyst circulating in the FCC unit. Effectively, the catalyst can enter the nozzles, either through a phenomenon known as "vena contracta", whereby the catalyst is drawn in by the venturi effect of the jet of fluid leaving the nozzle, or as a result of the catalyst weeping into the nozzle, for example in the case of low-flow rate operation. The catalyst that has entered the injection nozzle is expelled therefrom by the jet of fluid, causing nozzle erosion.

There are a number of solutions that have been envisioned in order to limit these erosion phenomena. One solution is to make the nozzles entirely out of ceramic, but such nozzles are fragile. Another solution is to make a nozzle out of metal covered with a layer of hard material, for example stellite. Such nozzles exhibit good resistance to erosion, but ultimately do have to be replaced.

Thus, the maintenance of these distribution systems still entails replacing a significant number of nozzles on each shutdown (around 20% of the nozzles, which corresponds to over 200 nozzles in this type of unit). Replacing the nozzles is a relatively lengthy operation as the nozzles need to be unwelded one by one. Thus, the number of nozzles that need to be replaced is regularly such that replacing the entire distribution system is planned in order to shorten the maintenance work.

There is therefore a need to limit and reduce the maintenance of gas injection systems subjected to erosion.

To this end, the subject matter of the invention relates to a gas injection element for a system for distributing gas into a chamber of a fluid catalytic cracking unit, said injection element comprising a passage passing right through it, characterized in that it comprises:
an internal element made of ceramic material of which an internal surface defines said through-passage over the entire length thereof,
a hollow metal sleeve, inside which sleeve there is housed at least part of the internal element, the sleeve and the internal element respectively having an internal surface and an external surface that are of complementing shapes allowing the internal element to move with respect to the sleeve in a direction parallel to an axis of the through-passage, said internal surface of the sleeve and external surface of the internal element being provided with fixing elements that collaborate to fix the sleeve and the internal element reversibly.

In other words, the fixing elements provide non-permanent (removable) fixing between the sleeve and the internal element. This allows the internal element that defines the through-passage to be changed out easily, making it possible to change it out quickly in the event of wear. The internal element is housed inside the sleeve: an internal surface of the sleeve therefore faces an external surface of the internal element. In particular, the external surface of the internal element is on the opposite side to the internal surface which defines the through-passage. It will thus be appreciated that these surfaces (the internal and external surfaces of the internal element and the internal surface of the sleeve) are parallel to the axis of the through-passage.

Advantageously, the external surface of the internal element and the internal surface of the sleeve may be surfaces of revolution, notably cylinders of revolution, having an axis of revolution coincident with or parallel to the axis of the through-passage. This allows the sleeve and the internal element to be produced more easily and makes it possible to simplify the design of the fixing elements.

The fixing elements may then comprise lugs or notches collaborating respectively with grooves or ribs of a suitable shape to allow the sleeve and the internal element to move between a fixed state and a freed state following movements in translation in a direction parallel to the axis of revolution and in rotation about the axis of revolution.

The sleeve and the internal element can thus be fixed and removed very simply through successive translational and rotational movements, or, respectively, rotational and translational movements. In particular, the transition from one state to another can be obtained by moving only the internal element with respect to the sleeve, through successive translational and rotational movements. In its simplest design, this type of fixing may therefore be similar to a bayonet or quarter-turn type of fixing.

The sleeve may advantageously be of cylindrical shape allowing it to be produced in a very simple way.

Advantageously, the internal element may have, at one of its ends, a flange bearing, in the fixed state, against one end of the sleeve in the direction of the axis of the through-passage. This flange thus forms an end stop able to improve the retention of the components. Advantageously, it extends perpendicular to the axis of the through-passage, from the external surface of the sleeve.

The sleeve is made of a metallic material, for example a metal or an alloy, preferably a stainless steel.

The ceramic material of the internal element may be chosen from silicon carbide SiC, boron carbide $B_4C$, silicon nitride $Si_3N_4$, aluminum nitride AlN, boron nitride BN, alumina $Al_2O_3$, or mixtures of these.

Advantageously, the ceramic material is silicon carbide SiC or contains silicon carbide SiC, preferably as a predominant constituent, for example in a content from 60 wt % to 99.9 wt %. Silicon carbide offers the advantage of having good mechanical and physical properties for a reasonable cost of manufacture.

As an alternative or possibly in combination, the ceramic material may comprise a ceramic matrix chosen from silicon carbide SiC, boron carbide $B_4C$, silicon nitride $Si_3N_4$, aluminum nitride AlN, boron nitride BN, alumina $Al_2O_3$ or mixtures of these, into which ceramic matrix there are incorporated fibers, for example carbon fibers or ceramic fibers, or mixtures of these.

The ceramic material is then a composite material. Such a composite material may be advantageous for injectors subjected to tensile and shear stresses. In particular, the fibers may be arranged randomly (pseudo-isotropically) or anisotropically. An anisotropic distribution of the fibers may prove advantageous in particular zones, for example the end zones intended to be assembled with another material or with another component or in the case of zones subjected to significant tensile/shear stress. When present, these fibers may represent from 0.1 to 10 wt % of the composite material.

The carbon fibers may be carbon fibers with the graphite planes oriented along the fiber.

The ceramic fibers may be chosen from crystalline alumina fibers, mullite ($3Al_2O_3$, $2SiO_2$) fibers, crystalline or amorphous silicon carbide fibers, zirconium fibers, silica-alumina fibers, or mixtures of these.

For preference, the composite ceramic material comprises a matrix of silicon carbide SiC, comprising fibers of the abovementioned type. For preference, the fibers are silicon carbide fibers.

Advantageously and non-limitingly, the ceramic material may be a sintered ceramic material. This may notably make the internal element easier to produce.

In that case, the internal element may be formed for example by molding or by extrusion, followed by firing, under conventional operating conditions suited to the type of ceramic produced. The firing step is possibly preceded by a drying step.

Advantageously, the internal walls of the internal element may be smooth, or in other words may have a low surface roughness. Such smooth walls may make it possible to increase the speeds in use inside the internal element.

Such a smooth wall may be obtained when the ceramic material is a sintered ceramic material.

Advantageously and non-limitingly, the internal element may be obtained from a relatively fine sintering powder, for example having a mean particle diameter less than or equal to 500 nm, which may lead to relatively smooth surfaces.

Alternatively or in addition, the internal element may be obtained by adding to the main material, for example SiC, an additive chosen from boron B, silicon Si and carbon C, or mixtures thereof, for example in a proportion varying from 0.3 wt % to 2 wt %. In the case of a SiC material obtained by sintering a powder, such an addition of additive may make it possible to reduce the porosity and therefore the roughness.

Advantageously and non-limitingly, the additive may comprise a mixture of boron B, silicon Si and carbon C. Additional SiC may thus be formed, which plugs the pores and thus reduces the roughness.

Alternatively or in addition, it may for example be possible to anticipate a step of additional deposition of SiC using chemical vapor deposition (CVD).

The invention also relates to a distribution system for distributing gas inside a chamber of a fluid catalytic cracking unit, said distribution system comprising a support wall pierced with at least one orifice and defining at least part of a cavity, the support wall having a first face intended to be in contact with a gas contained in this cavity, and a second face on the opposite side to the first face.

By way of example, this support wall may be a grid, a pierced plate or may define a tube, notably a curved tube closed on itself in the manner of a torus, or else may define several criss-crossing tubes (pipe grid or air grid).

According to the invention, the distribution system comprises at least one injection element as described hereinabove, the injection element being secured to the support wall, at the orifice, so that gas originating from the cavity can circulate through the support wall toward the second face thereof via the passage of the internal element secured to the sleeve, only the sleeve being secured to the support wall.

It will thus be appreciated that the internal element may easily be removed, without the need to detach the sleeve from the support wall, insofar as it is fixed only to the sleeve. This makes it possible to reduce the time needed for changing out the internal element.

Advantageously, the sleeve may be secured to the support wall by one end, notably in such a way as not to project from the second face of said support wall.

As an alternative or in combination, the sleeve may be secured to the support wall by one end, notably inserted into the orifice.

Advantageously, in the fixed state, the internal element may pass through said orifice and at one of its ends have a flange bearing against one end of the sleeve. This may make the internal element easier to fit.

One end of the sleeve which end is inserted into the orifice may then bear against the flange of said internal element.

The invention is now described with reference to the attached non-limiting drawings in which.

Figure 1:
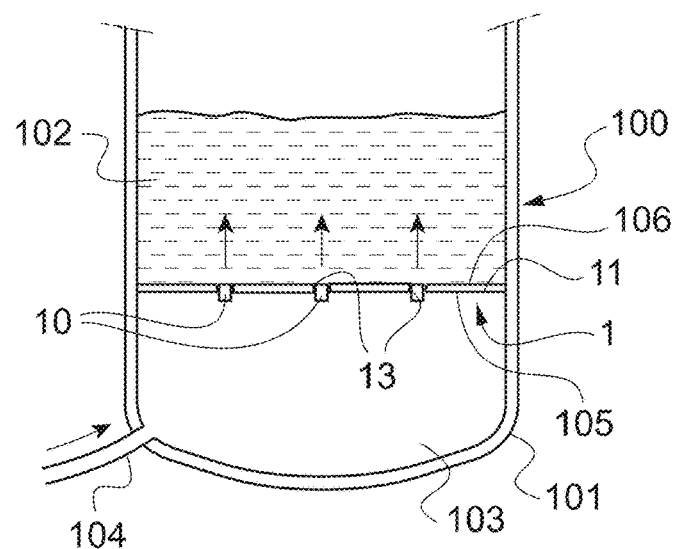
FIG. 1 illustrates a partial schematic depiction in cross section of a chamber comprising a gas distribution system according to one embodiment.

FIG. 1 partially depicts a chamber 100 that forms part of a fluid catalytic cracking FCC unit not depicted in its entirety. The chamber depicted here is a chamber of a regenerator, in which coke deposited on the catalyst coming from a reactor of the FCC unit (not depicted) is burnt off.

The catalyst in the chamber 100 forms a fluidized bed 102.

A distribution system 1 allows air, and therefore the oxygen needed for burning the coke, to be injected into this fluidized catalytic bed 102.

This distribution system 1 comprises a support wall, in this instance a perforated plate 11, occupying the entirety of a section of the chamber 100, and supporting the fluidized bed 102. This plate thus, with the end walls of the chamber, defines an air cavity 103. A pipe 104 opening onto this cavity 103 is able to supply pressurized air.

The plate thus comprises a first face 105 in contact with the air of the cavity 103 and a second face 106 in contact with the fluidized bed 102.

The perforated plate 11 here is a steel plate 11a. It may have a refractory coating 11b made of composite material (depicted in FIG. 2) on the side of the second face 106. This refractory coating is obtained for example by pouring concrete onto a steel mesh not depicted, for example in the form of a honeycomb comprising a plurality of hexagonal mesh cells joined to one another along their sides (a "hex mesh"), or the like.

Mounted on each orifice 13 of the plate 11 is a gas injection element 10, in this instance an air injection nozzle.

Figure 2:
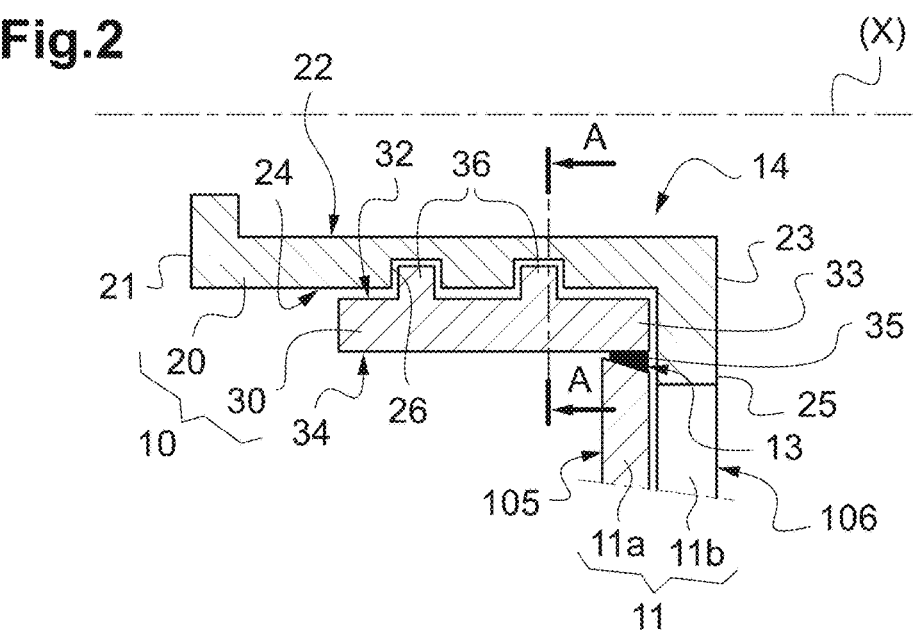
FIG. 2 illustrates a partial schematic depiction in cross section of an injection element according to one embodiment.
Figure 3:
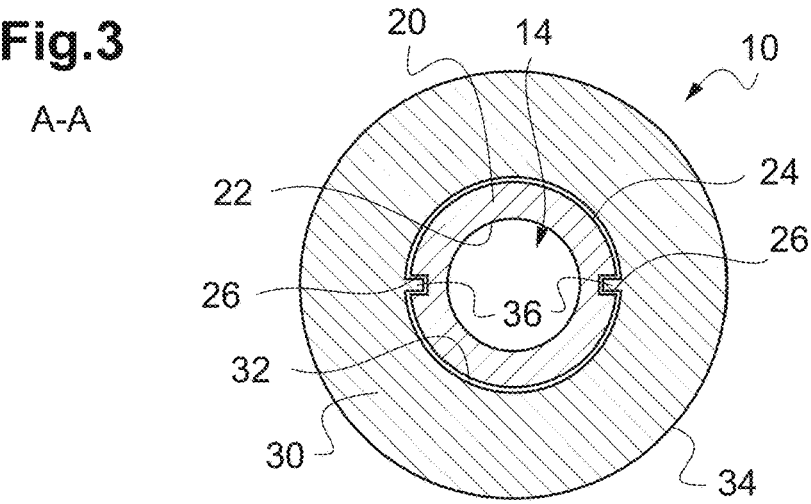
FIG. 3 depicts a view of FIG. 2 in cross section on A-A.

This injection element 10 is described with reference to FIGS. 2 and 3. It comprises a passage 14 passing right through it, of axis X. The injection element 10 is thus secured to the support wall 11 in such a way that gas originating from the cavity 103 can circulate through the support wall 11 toward the second face 106 thereof via the through-passage 14.

This injection element 10 further comprises:

an internal element 20 made of ceramic material, a hollow metal sleeve 30, inside which at least part of the internal element 20 is housed.

The internal element 20 comprises an internal surface 22, which defines the through-passage 14 over the entire length thereof, and an external surface 24. As visible in FIGS. 2 and 3, this internal surface 22 and this external surface 24 are on opposite sides and extend parallel to the axis X of the through-passage 14.

The sleeve 30 comprises an internal surface 32 and an external surface 34. This internal surface 32 and this external surface 34 are also on opposite sides and extend parallel to the axis X of the through-passage 14.

The internal surface 32 of the sleeve 30 and the external surface 24 of the internal element 20 have complementing shapes allowing the internal element 20 to move with respect to the sleeve 30 in a direction parallel to the axis X of the through-passage. This internal surface 32 of the sleeve and this external surface 24 of the internal element are also provided with fixing elements that collaborate to fix the sleeve 30 and the internal element 20 reversibly.

In general, whatever the embodiment and notably whatever the shape of the support wall 11, this internal surface 32 of the sleeve and this external surface 24 of the internal element are configured to allow a relative movement of the sleeve 30 and of the internal element 20 between a fixed state of the sleeve and of the internal element, in which these elements, are secured to one another, and a freed state of these elements in which they can be separated from one another. For preference, the transition from one state to the other is obtained by a movement of the internal element 20, the sleeve 30 remaining fixed.

In the example depicted, the external surface 24 of the internal element 20 and the internal surface 32 of the sleeve 30 are surfaces of revolution, in this instance cylinders of revolution, having an axis of revolution coincident with or parallel to, in this instance coincident with, the axis X of the through-passage.

In this example, it will be noted that the internal element 20 is cylindrical over a large proportion of its length (just one of its ends 21 having a narrowing), the sleeve 30 being entirely cylindrical.

It will also be noted that the sleeve 30 surrounds the internal element 20 over just a part of its length. However, the invention is not limited to a particular length and shape of the sleeve 30 and of the internal element 20, provided that they can be secured to/detached from one another.

Thus, in general, when the internal element 20 is housed inside the sleeve 30, the external surface 24 of the internal element 20 faces the internal surface 32 of the sleeve 30.

In the example depicted, the fixing elements that secure the internal element 20 to the sleeve 30 comprise lugs or notches collaborating respectively with grooves or ribs of a suitable shape to allow the sleeve 30 and the internal element 20 to move between the fixed state and the freed state following movements in translation in a direction parallel to the axis of revolution X and in rotation about the axis of revolution X.

More specifically, in this example, the sleeve 30 has lugs 36 which project from its internal surface 32 perpendicular to the axis of revolution X, toward the latter (radially). These lugs 36 collaborate with grooves 26 formed in the external surface 24 of the internal element 20. These grooves 26 are, for example, L-shaped, with one part (visible in FIG. 3) extending parallel to the axis X from one end 21 of the internal element 20, allowing the internal element 20 to be inserted inside the sleeve 30 in a translational movement of axis X, the end of the groove 26 turning at right angles (FIG. 2) so as to allow the internal element 20 to be rotated with respect to the sleeve 30 and locked. FIG. 3 depicts a view in transverse section of the internal element and of the sleeve, before the rotation of the internal element 20, whereas FIG. 2 is a depiction after rotation. Thus, in the first relative position depicted in FIG. 3, the internal element 20 can be extracted from/inserted into the sleeve 30 by a translational movement along the axis X, the lugs 36 sliding along the first part of the grooves 26 parallel to the axis X, inside these grooves 26. In the second relative position depicted in FIG. 2, the lugs 36 are in the second part of the grooves 26 which part extends in a plane perpendicular to the axis X: the only possible movement between the sleeve 30 and the internal element 20 is a rotation about X. In other words, the cross section depicted in FIG. 3 is a section on A-A depicted in FIG. 2, but the internal element 20 depicted in FIG. 3 is in a different position from that depicted in FIG. 2. It will thus be appreciated that, from the position depicted in FIG. 2, it is possible to pivot the internal element 20 with respect to the axis X in order to bring it into the position depicted in FIG. 3, allowing it to be extracted from the sleeve 30 by a translational movement parallel to the axis X.

The invention is not limited to this particular embodiment: the lugs 36 could form part of the internal element 20 and the grooves 26 be produced on the sleeve 30. It might also be possible to envision replacing the lugs with notches collaborating not now with grooves but with ribs parallel to the axis X and the length of which is chosen so that the rotation of the parts relative to one another allows the end of the ribs to bear against the unnotched periphery of the other part. Neither is the invention limited to a particular number of ribs/grooves and notches/lugs, it also being possible for these various embodiments to be combined.

It will be noted that, in the example depicted, one end 33 of the sleeve 30 is secured to the support wall 11 in such a way as not to project from the second face 106 of said support.

In the example, this end 31 is inserted into the orifice 13 in the support wall 11 and fixed thereto by a welded seam 35. The external surface 34 of the sleeve in this instance is welded to the support wall 11.

Furthermore, the internal element 20 has an end 23 provided with a flange 25, which here bears in the direction of the axis X against the end 33 of the sleeve 30 when the two elements are in the fixed state. In the example, this flange 25 comes against the coating 12 and lies flush therewith (see FIG. 2). The invention is not limited to this particular embodiment; the flange could be larger and bear against the second face 106. The internal element could equally have no flange 25.

It will be noted that, in the fixed state, only the sleeve 30 is secured to the support wall 11, so that the internal element 20 can easily be replaced, through a suitable movement.

The gas injection element has been described with reference to a system for distributing air in a regenerator of an FCC unit. The invention is not limited to this embodiment; the gas distribution system could equally be a system for distributing steam in a stripping zone of a reactor of an FCC unit, or any other gas or steam injection element of an FCC unit.

The invention claimed is:

1. A gas injection element for a system for distributing gas into a chamber of a fluid catalytic cracking unit, said injection element comprising a passage passing right through said injection element, characterized in that said injection element comprises:

an internal element made of ceramic material of which an internal surface defines said through-passage over the entire length thereof, said internal element having an external surface on the opposite side to said internal surface, a hollow metal sleeve having an internal surface, inside which sleeve there is housed at least part of the internal element, the internal surface of the sleeve facing the external surface of the internal element, the internal surface of the sleeve and the external surface of the internal element being of complementing shapes allowing the internal element to move with respect to the sleeve in a direction parallel to an axis (X) of the through-passage, said internal surface of the sleeve and external surface of the internal element being provided with fixing elements that collaborate to fix the sleeve and the internal element reversibly, wherein the fixing elements comprise lugs or notches collaborating respectively with grooves or ribs of a suitable shape to allow the sleeve and the internal element to move between a fixed state and a freed state following movements in translation in a direction parallel to the axis of revolution and in rotation about the axis of revolution.

2. The gas injection element as claimed in claim 1, characterized in that the external surface of the internal element and the internal surface of the sleeve are surfaces of revolution, notably cylinders of revolution, having an axis of revolution coincident with or parallel to the axis (X) of the through-passage.

3. The gas injection element as claimed in claim 1, characterized in that the sleeve is of cylindrical shape.

4. The gas injection element as claimed in claim 1, characterized in that the internal element has, at one of its ends, a flange bearing, in the fixed state, against one end of the sleeve in the direction of the axis of the through-passage.

5. The gas injection element as claimed in claim 1, characterized in that the ceramic material is chosen from silicon carbide SiC, boron carbide $B_4C$, silicon nitride $Si_3N_4$, aluminum nitride AlN, boron nitride BN, alumina $Al_2O_3$, or mixtures of these.

6. The gas injection element as claimed in claim 1 characterized in that the ceramic material comprises a ceramic matrix chosen from silicon carbide SiC, boron carbide $B_4C$, silicon nitride $Si_3N_4$, aluminum nitride AlN, boron nitride BN, alumina $Al_2O_3$ or mixtures of these, into which ceramic matrix there are incorporated fibers chosen from carbon fibers and ceramic fibers, the ceramic fibers being chosen for example from crystalline alumina fibers, mullite fibers, crystalline or amorphous silicon carbide fibers, zirconium fibers, silica-alumina fibers, or mixtures of these.

7. A distribution system for distributing gas inside a chamber of a fluid catalytic cracking unit, said distribution system comprising a support wall pierced with at least one orifice and defining at least part of a cavity, the support wall having a first face intended to be in contact with a gas contained in this cavity, and a second face on the opposite side to the first face, characterized in that it comprises at least one injection element as claimed in claim 1, the injection element being secured to the support wall, at the orifice, so that gas originating from the cavity can circulate through the support wall toward the second face thereof via the passage of the internal element secured to the sleeve, only the sleeve being secured to the support wall.

8. The gas distribution system as claimed in claim 7, characterized in that one end of the sleeve is secured to the support wall in such a way as not to project from the second face of said support wall.

9. The gas distribution system as claimed in claim 7, characterized in that one end of the sleeve is inserted into the orifice.

* * * * *